(12) United States Patent
Mysore et al.

(10) Patent No.: US 12,111,754 B1
(45) Date of Patent: Oct. 8, 2024

(54) DYNAMICALLY VALIDATING AI APPLICATIONS FOR COMPLIANCE

(71) Applicant: Citibank, N.A., New York, NY (US)

(72) Inventors: Vishal Mysore, Mississauga (CA); Ramkumar Ayyadurai, Jersey City, NJ (US); Chamindra Desilva, London (GB)

(73) Assignee: CITIBANK, N.A., New York, NY (US)

( * ) Notice: Subject to any disclaimer, the term of this patent is extended or adjusted under 35 U.S.C. 154(b) by 0 days.

(21) Appl. No.: 18/637,362

(22) Filed: Apr. 16, 2024

(51) Int. Cl.
*G06F 11/36* (2006.01)
*G06N 5/045* (2023.01)

(52) U.S. Cl.
CPC ...... *G06F 11/3684* (2013.01); *G06F 11/3688* (2013.01); *G06F 11/3692* (2013.01); *G06N 5/045* (2013.01)

(58) Field of Classification Search
CPC .......................... G06F 8/36–3696; G06N 5/045
See application file for complete search history.

(56) References Cited

U.S. PATENT DOCUMENTS

2022/0198304 A1\* 6/2022 Szczepanik ............. H04L 63/12

OTHER PUBLICATIONS

Nauta, M., et al., "From Anecdotal Evidence to Quantative Evaluation Methods: A Systematic Review of Evaluating Explainable AI" ACM Computing Surveys, vol. 55 No. 13s Article 295, 2023 [retrieved Jul. 3, 2024], Retrieved From Internet: <URL: https://dl.acm.org/doi/full/10.1145/3583558>, whole document.\*

\* cited by examiner

*Primary Examiner* — Todd Aguilera
(74) *Attorney, Agent, or Firm* — Perkins Coie LLP

(57) ABSTRACT

The technology evaluates the compliance of an AI application with predefined guidelines. The technology obtains a set of guidelines defining operation boundaries of the AI application and constructs test cases associated with each guideline. Each test case can include a prompt, an expected outcome, and an expected explanation. The technology supplies the prompts to the AI application, receives case-specific outcomes and explanations from the AI application, and compares them with the expected outcomes and expected explanations. A compliance indicator is generated based on the evaluation results, indicating the degree of compliance of the AI application with the guidelines.

18 Claims, 8 Drawing Sheets

DYNAMICALLY VALIDATING AI APPLICATIONS FOR COMPLIANCE

TECHNICAL FIELD

The systems, methods, and computer-readable media disclosed herein relate generally to determining compliance of artificial intelligence (AI) applications. Some implementations described herein relate to evaluating an adherence of the AI application to guidelines and regulations.

BACKGROUND

Artificial intelligence ("AI") models often operate based on extensive and enormous training models. The models include a multiplicity of inputs and how each should be handled. When the model receives a new input, the model produces an output based on patterns determined from the data the model was trained on. The regulation of artificial intelligence is the development of public sector policies and laws for promoting and regulating artificial intelligence (AI). AI regulations aim to address concerns such as bias, fairness, safety, privacy, and security. Key areas of focus include data protection, algorithmic transparency, accountability for AI decisions, ethical considerations, and standards for AI development and use. AI regulations can vary significantly based on different factors such as jurisdiction, industry, and organizational policies. However, traditional approaches to regulatory compliance involving the manual interpretation of regulatory texts are labor-intensive, error-prone, and lack scalability, making the approach increasingly unsustainable in the face of growing regulations.

Figure 1:
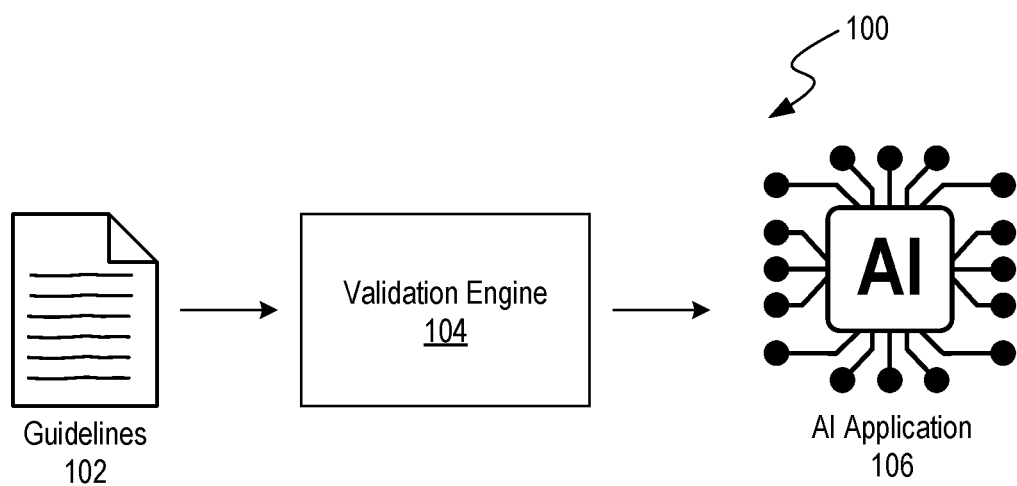
FIG. 1 is a block diagram illustrating an example environment for determining AI compliance, in accordance with some implementations of the present technology.

The drawings have not necessarily been drawn to scale. For example, some components and/or operations may be separated into different blocks or combined into a single block for the purposes of discussion of some of the implementations of the disclosed system. Moreover, while the technology is amenable to various modifications and alternative forms, specific implementations have been shown by way of example in the drawings and are described in detail below. The intention, however, is not to limit the technology to the particular implementations described. On the contrary, the technology is intended to cover all modifications, equivalents and alternatives falling within the scope of the technology as defined by the appended claims.

DETAILED DESCRIPTION

AI applications offer a powerful framework for extracting insights and making predictions from data. One of the key advantages of AI applications lies in an AI model's ability to automatically identify patterns and relationships within complex datasets, even in the absence of explicit programming. The capability enables AI applications to uncover relationships, predict future outcomes, and drive data-driven decision-making across various fields. However, as AI technologies continue to evolve, so do the regulatory landscapes governing the created AI applications. AI applications face increasing scrutiny and legal obligations to ensure that AI applications comply with the evolving regulations and ethical standards.

Compliance of AI applications includes adhering to an array of requirements, such as data privacy, consumer protection, and industry-specific regulations. For example, the General Data Protection Regulation (GDPR) in Europe imposes requirements on the collection, processing, and storage of personal data, and requires safeguards in AI systems to protect user privacy. Similarly, regulations such as the Health Insurance Portability and Accountability Act (HIPAA) in the healthcare sector include measures to safeguard patient data confidentiality and security in AI-driven healthcare applications. Organizational regulations also vary widely depending on the industry, corporate culture, and risk tolerance of the company. Organizational regulations can cover aspects such as data governance, model validation, and algorithmic transparency to uphold ethical standards and mitigate potential risks associated with AI technologies. For instance, financial institutions implement regulations to ensure the fairness and accuracy of AI-driven credit risk assessment models, while technology companies may focus on safeguarding user privacy and data security in AI-driven products and services.

Traditional approaches to regulatory compliance often involve manual interpretation of regulatory texts, followed by ad-hoc efforts to align AI systems with compliance requirements. However, the manual process is labor-intensive, error-prone, and lacks scalability, which makes the approach increasingly unsustainable in the face of growing regulations.

For example, manual processes in regulatory compliance are labor-intensive because interpreting complex regulatory language often requires domain expertise and/or tedious evaluations. Human analysts need to sift through lengthy documents, decipher technical jargon, and understand the nuances of regulatory requirements. The manual process demands significant time and effort, as even small errors or misunderstandings can have severe implications for compliance. Further, the sheer volume of regulatory documents and updates to the regulations can exacerbate the labor-intensive nature. For example, in dynamic industries such as healthcare or finance, regulatory bodies regularly issue new guidelines, amendments, and interpretations, leading to a continuous influx of regulations that must be reviewed and understood so that AI applications can be adjusted accordingly if needed. Keeping AI applications in compliance with the changes requires continuous monitoring of regulatory updates and timely implementation of compliance measures, both of which consume large amounts of resources such as time and labor.

Additionally, the manual interpretation of complex regulatory language is error-prone and can lead to misunderstandings or misinterpretations, particularly when dealing with nuanced requirements. For example, individuals manually interpreting the nuanced regulations can struggle to accurately decipher the precise obligations imposed by the nuanced regulations and/or interpret the regulations differently from other individuals, potentially resulting in inadvertent violations or oversights. Further, the large volume of regulatory updates and changes can increase the likelihood of overlooking updates or misinterpreting regulatory changes. For example, manual processes can be more susceptible to typographical errors, transcription mistakes, and inconsistencies, which can compromise the compliance of the AI application.

Manual processes can struggle to keep pace with the development cycles of AI projects as the AI applications scale, resulting in compliance gaps and regulatory violations. As the volume of regulatory documents, updates, and compliance tasks increases, organizations need to allocate additional resources or hire more staff to manage the workload, which can be costly and unsustainable in the long term. Additionally, conventional manual processes are typically designed to handle compliance tasks sequentially, one regulation at a time. The serial approach can lead to a series of repeated modifications and adjustments, each addressing a specific regulation in isolation. Analyzing the regulations in a piecemeal manner often fails to consider the broader context of regulatory compliance and can overlook the cumulative impact of multiple regulations on organizational processes and systems. As a result, manual processes struggle to scale effectively to meet the dynamic and evolving compliance requirements of modern organizations.

Manual compliance processes additionally often struggle to handle the interdependence of regulations, making ensuring compliance challenging across multiple regulatory frameworks simultaneously. When organizations attempt to modify their processes or systems to comply with one set of regulations, the organizations may inadvertently create non-compliance issues with other sets of regulations. This is because regulations often overlap in topic coverage with one another and/or require an understanding of the interrelationships with other regulations. For example, a change made to update data privacy measures in response to one set of regulations can inadvertently compromise data security requirements mandated by another set of regulations if overly restrictive user authentication mechanisms impede access to data needed for regulatory reporting. Similarly, modifications aimed at improving transparency and accountability can inadvertently undermine requirements related to consumer protection laws if there is an excessive disclosure of personal data. Without complete visibility into the interconnectedness of regulatory requirements, manual processes are ill-equipped to navigate the interactions effectively.

Thus, the lack of standardized processes and tools for evaluating regulatory compliance leads to inefficiencies in compliance management within and across organizations. Furthermore, the consequences of non-compliance can be severe, including legal penalties, reputational damage, and loss of consumer trust. As AI applications play a growing role in decision-making processes, such as loan approvals, medical diagnoses, and risk assessments, the need for regulatory compliance mechanisms increases.

This document discloses methods, apparatuses, and systems that provide a systematic and automated approach to assess and ensure adherence to guidelines (e.g., jurisdictional regulations, organizational regulations). The disclosed technology addresses the complexities of regulatory compliance for AI applications. In some implementations, the system translates guidelines into actionable test cases for evaluating AI application compliance. By parsing and interpreting guidelines (e.g., regulatory documents), the system identifies relevant compliance requirements and operational boundaries that must be complied with in an AI application. The system constructs a set of test cases associated with each guideline that covers various scenarios derived from the regulatory requirements. These test cases can include prompts, expected outcomes, and/or expected explanations.

The system evaluates the AI application against the set of test cases and generates one or more compliance indicators based on comparisons between expected and actual outcomes and explanations. For example, if the AI application's response meets the expected outcome and explanation, the AI application receives a positive compliance indicator. If there are discrepancies, the system can flag these as areas requiring further attention or modification. In some implementations, the system can automatically adjust to the parameters of the AI application to ensure alignment with regulatory guidelines. In some implementations, the system provides mechanisms for ongoing compliance monitoring and auditing to ensure that AI applications remain in compliance with the guidelines. For example, the system can continuously monitor AI applications for deviations from established guidelines and thresholds. The system enables organizations to detect and remediate compliance issues in real-time, reducing the likelihood of regulatory violations or enforcement actions.

For example, in an AI application directed toward assessing loan applications, various factors such as credit history, income, and employment status, can be used to predict the creditworthiness of applicants and determine whether to approve or deny the applicants' loan requests. However, the Equal Credit Opportunity Act (ECOA) and the Fair Credit Reporting Act (FCRA) prohibits financial institutions from using factors such as race, gender, or age in credit-scoring decisions to prevent discriminatory lending practices. Without systems to monitor and evaluate the AI application's decision-making processes, there is a risk that non-compliant decision-making factors are used in predicting the creditworthiness of applicants. The lack of transparency and interpretability in AI algorithms makes it difficult for regulatory authorities to assess whether the AI application's outcomes are fair and unbiased. By implementing the implementations described herein, the institution can obtain a set of relevant regulatory guidelines defining the operation boundaries of the AI application, construct test cases to evaluate the AI application's compliance with these guidelines, and generate one or more compliance indicators to identify areas of non-compliance and guide corrective actions. For example, the institution can use the system to evaluate the AI application against a set of test cases designed to assess the AI application's adherence to regulations prohibiting discriminatory lending practices. By supplying prompts related to prohibited attributes such as race or gender into the AI system and comparing the expected outcomes and explanations to the case-specific outcomes and explanations generated by the system, the institution can identify any discrepancies or biases that may exist and take appropriate measures to address them.

Unlike manual processes that rely on humans to interpret regulatory language and assess compliance, the system can parse and interpret regulatory guidelines automatically. The automated parsing and interpretation significantly reduce the time and effort required to understand complex regulatory requirements. By translating regulatory guidelines into actionable test cases, the system streamlines the compliance assessment process. The test cases cover various scenarios derived from the regulatory requirements and eliminate the need for manual creation and evaluation of compliance criteria for each guideline. The system can identify specific terms, phrases, or clauses denoting regulatory requirements, and automatically create the test cases using the identified information.

Additionally, by using automation and standardized evaluation criteria, the system reduces the risk of human error in understanding nuanced requirements. The implementations discussed herein can compare the expected outcomes and explanations derived from regulatory guidelines and actual outcomes and explanations generated by AI applications. The automated evaluation process helps identify discrepancies or inconsistencies in a standardized and unbiased manner, reducing the risk of compliance errors.

The disclosed technology addresses the scalability limitations of conventional manual compliance processes by introducing automated workflows and standardized procedures for compliance assessment. The automation reduces the time and effort required to review and understand regulatory documents, allowing organizations to process a larger volume of regulations more efficiently. By automatically identifying relevant compliance requirements and operational boundaries from regulatory documents, the system accelerates the compliance review process and enables organizations to keep pace with the continuous influx of regulatory updates. Additionally, by defining predefined criteria for compliance evaluation, the system ensures that compliance assessments are conducted in a systematic and uniform manner, regardless of the complexity or volume of regulations. Instead of conducting compliance assessments in isolation, organizations can assess compliance across various regulations and jurisdictions concurrently. The parallel approach reduces the time and effort required to evaluate compliance and allows organizations to implement changes with a cumulative and overall view of the regulations.

Similarly, implementations discussed herein can consider the interdependencies between different regulations and the potential impacts on compliance obligations. Instead of treating regulations as independent silos, the system evaluates the cumulative impact of multiple regulations on organizational processes and systems. By understanding the interconnectedness of regulatory requirements, organizations can reduce the time and effort spent in ensuring their compliance with the regulations.

In the following description, for the purposes of explanation, numerous specific details are set forth in order to provide a thorough understanding of the implementations of the present technology. It will be apparent, however, to one skilled in the art that implementation of the present technology can be practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

Dynamic Validation System

FIG. 1 is a block diagram illustrating an example environment 100 for determining AI compliance, in accordance with some implementations of the present technology. Environment 100 includes guidelines 102, validation engine 104, and AI application 106. AI application 106 and validation engine 104 are implemented using components of example computer system 800 illustrated and described in more detail with reference to FIG. 8. Likewise, embodiments of example environment 100 can include different and/or additional components or can be connected in different ways.

The guidelines 102 operate as an input into the validation engine 104. The guidelines 102 can encompass regulations such as regulatory standards, organizational policies, and industry best practices relevant to the AI application's 106 domain. The validation engine 104 can be communicatively connected to an API and/or other data sources containing regulatory documents and organizational policies to obtain the guidelines 102. Connecting to an API allows for real-time access to the latest guidelines 102 and updates and ensures that the validation process is based on the most current regulatory and policy requirements. For example, the API can provide endpoints for querying specific regulations or policies based on keywords, categories, or jurisdictions that enables dynamic retrieval of relevant guidelines.

In some implementations, guidelines 102 are obtained by manual input by users. For example, users input relevant regulations and policies (e.g., guidelines 102) directly into the validation engine 104 through a user interface communicatively connected to the validation engine 104. In some implementations, guidelines 102 are obtained from pre-existing databases or repositories maintained by regulatory bodies, industry organizations, and/or third-party providers. The databases can be periodically updated and synchronized with the validation engine 104 to ensure alignment with the latest regulatory changes and industry standards. Additionally, machine learning algorithms can be employed to automatically identify and extract guidelines 102 from unstructured text data, reducing the need for manual intervention in the data collection process.

To incorporate the guidelines 102 into the validation process, the guidelines 102 can be parsed, processed, and translated into actionable criteria for assessment. The validation engine 104 can analyze the textual content of the guidelines 102, extract relevant information, and categorize the guidelines 102 based on predefined criteria (e.g., standards, rules, or parameters established in advance to guide the analysis and categorization of textual content). For example, even if the guidelines 102 exist in different formats and structures, Natural Language Processing (NLP) techniques can be used to parse each text and identify key regulations, policies, and practices embedded within the differently formatted guidelines 102. The validation engine 104 can identify specific terms, phrases, or clauses that likely denote regulatory requirements, as well as understand the context and intent behind these provisions. For example, the validation engine 104 identifies terms or phrases indicating regulations concerning the collection of personal data, such as "consent," "data minimization," or "lawful basis," and categorizes guidelines 102 including the identified words and phrases as containing provisions related to obtaining user consent for data processing or specifying permissible purposes for data collection. Further methods of identifying relevant features within the guidelines 102 are discussed with reference to FIG. 4.

In some implementations, once the guidelines 102 are obtained, the guidelines 102 are pre-processed into a standardized format suitable for assessment by the validation engine 104. For example, the guidelines 102 can be encoded into a structured representation (e.g., JSON, XML), with specific fields for criteria, requirements, and/or thresholds. In some implementations, the guidelines 102 are categorized and tagged based on the extent of the guideline's 102 relevance to different aspects of AI compliance (e.g., fairness, transparency, privacy, security). Example methods of identifying relevant guidelines and tagging the guidelines 102 are discussed further in FIG. 3.

The validation engine 104 evaluates the AI application's 106 compliance with the guidelines 102. The validation engine 104 inputs test cases created from the criteria in the guidelines 102 into the AI application 106 and evaluates the AI application's 106 outcomes and explanations. Methods of evaluating the AI application 106's compliance with the guidelines 102 are discussed in further detail with references to FIG. 2 and FIG. 6. In some implementations, manual review by another individual can be used to validate the results of the validation engine.

The AI application's 106 outcome and explanation include alphanumeric characters representing the result of the AI application's 106 decision-making process. For example, in a loan approval application, the outcome can consist of alphanumeric values indicating whether a loan application is approved or denied based on the AI application's 106 assessment of the applicant's creditworthiness. The explanation generated by the AI application 106 includes a set of descriptors associated with a series of steps taken by the AI application 106 to arrive at the outcome (e.g., result). The descriptors provide insights into the decision-making process followed by the AI application 106, such as the factors considered, the data utilized, and the reasoning behind the decision. The descriptors can encompass various elements such as a ranking of the considered feature based on importance, decision paths, confidence scores, or probabilistic estimates associated with different outcomes.

Figure 2:
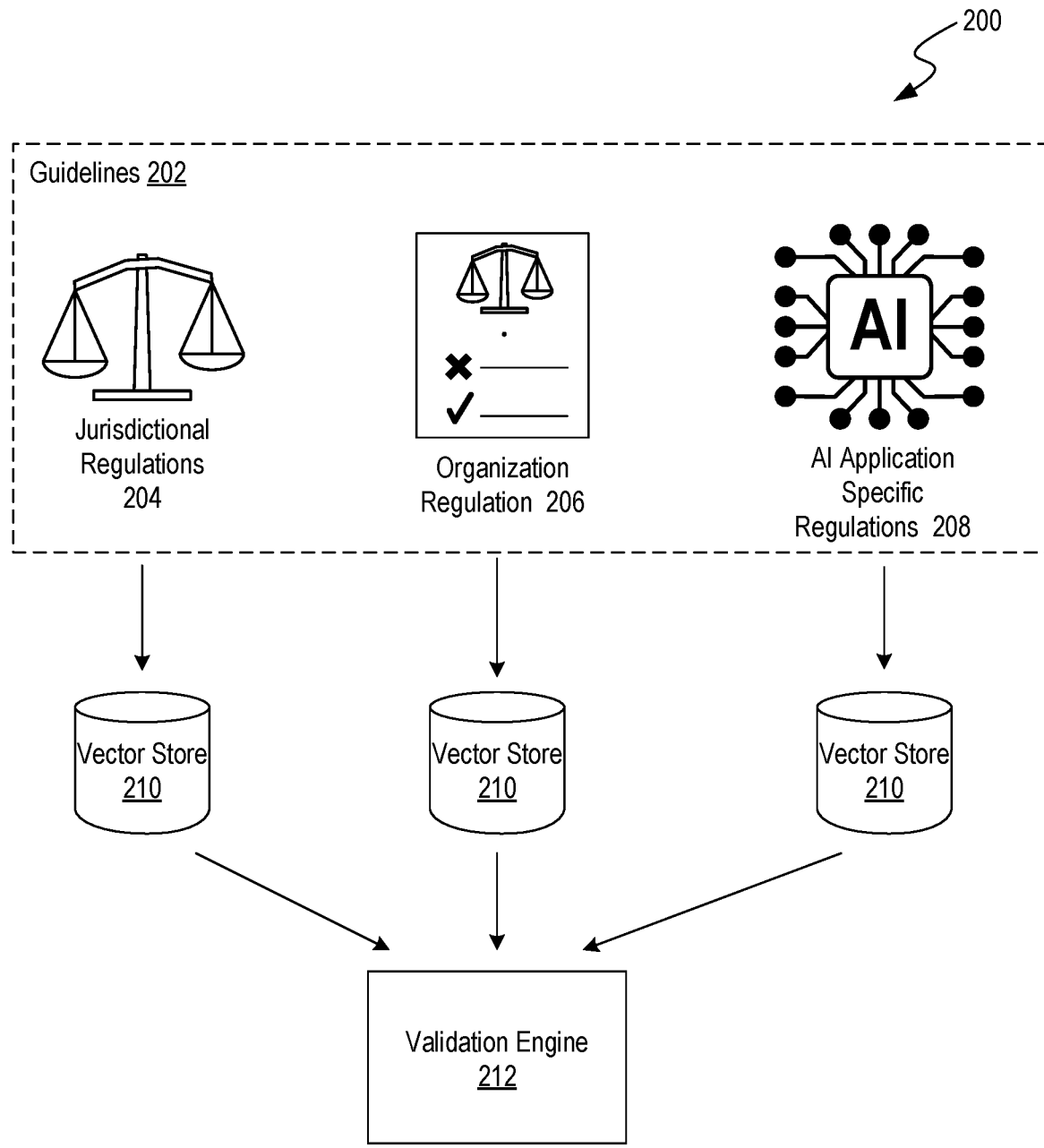
FIG. 2 is a block diagram illustrating an example environment for using the guidelines input into the validation engine for determining AI compliance, in accordance with some implementations of the present technology.

FIG. 2 is a block diagram illustrating an example environment 200 for using the guidelines input into the validation engine for determining AI compliance, in accordance with some implementations of the present technology. Environment 200 includes guidelines 202 (e.g., jurisdictional regulations 204, organization regulation 206, AI application-specific regulations 208), vector store 210, and validation engine 212. Guidelines 202 can be any of the guidelines 102 illustrated and described in more detail with reference to FIG. 1. Validation engine 212 is the same as or similar to validation engine 104 illustrated and described in more detail with reference to FIG. 1. Vector store 210 and validation engine 212 are implemented using components of example computer system 800 illustrated and described in more detail with reference to FIG. 8. Likewise, embodiments of example environment 200 can include different and/or additional components or can be connected in different ways.

Guidelines 202 can include various elements such as jurisdictional regulations 204, organizational regulations 206, and AI applications-specific regulations 208 (e.g., unsupervised learning, natural language processing (NLP), generative AI). Jurisdictional regulations 204 (e.g., governmental regulations) can include regulations gathered from authoritative sources such as government websites, legislative bodies, and regulatory agencies. Jurisdictional regulations 204 can be published in legal documents or official publications and cover aspects related to the development, deployment, and use of AI technologies within specific jurisdictions. Organizational regulations 206 includes internal policies, procedures, and guidelines established by organizations to govern AI-related activities within the organization's operations. Organizational regulations 206 can be developed in alignment with industry standards, legal requirements, and organizational objectives. AI application-specific regulations 208 include regulations that pertain to specific types of AI applications, such as unsupervised learning, natural language processing (NLP), and generative AI. Each type of AI application presents unique challenges and considerations in terms of compliance, ethical use, and/or regulatory adherence. For example, unsupervised learning algorithms, where the model learns from input data without labeled responses, may be subject to regulations that prevent bias and discrimination in unsupervised learning models. Natural language processing (NLP) technologies, which enable computers to understand, interpret, and generate human language, may be subject to specific regulations aimed at safeguarding user privacy. Generative AI, which autonomously creates new content, may focus on intellectual property rights, content moderation, and ethical use cases. AI developers may need to incorporate additional mechanisms for copyright protection, content filtering, and/or user consent management to comply with regulations related to generative AI technologies.

The guidelines 202 are stored in a vector store 210. The vector store 210 stores the guidelines 202 in a structured and accessible format (e.g., using distributed databases or NoSQL stores), which allows for efficient retrieval and utilization by the validation engine 212. In some implementations, the guidelines 202 are preprocessed to remove any irrelevant information, standardize the format, and/or organize the guidelines 202 into a structured database schema. Once the guidelines 202 are prepared, the guidelines 202 can be stored in a vector store 210 using distributed databases or NoSQL stores.

To store the guidelines 202 in the vector store 210, the guidelines 202 can be encoded into vector representations for subsequent retrieval by the validation engine 212. The textual data of the guidelines 202 are transformed into numerical vectors that capture the semantic meaning and relationships between words or phrases in the guidelines 202. For example, the text is encoded into vectors using word embeddings and/or TF-IDF encoding. Word embeddings, such as Word2Vec or GloVe, learn vector representations of words based on the word's contextual usage in a large corpus of text data. Each word is represented by a vector in a high-dimensional space, where similar words have similar vector representations. TF-IDF (Term Frequency-Inverse Document Frequency) encoding calculates the importance of a word in a guideline relative to the word's frequency in the entire corpus of guidelines 202. For example, the system can assign higher weights to words that are more unique to a specific document and less common across the entire corpus.

In some implementations, the guidelines 202 are stored using graph databases such as Neo4j™ or Amazon Neptune™. Graph databases represent data as nodes and edges, allowing for the modeling of relationships between guidelines 202 to demonstrate the interdependencies. In some implementations, the guidelines 202 are stored in a distributed file system such as Apache Hadoop™ or Google Cloud Storage™. These systems offer scalable storage for large volumes of data and support parallel processing and distributed computing. Guidelines 202 stored in a distributed file system can be accessed and processed by multiple nodes simultaneously, which allows for faster retrieval and analysis by the validation engine.

The vector store 210 can be stored in a cloud environment hosted by a cloud provider, or a self-hosted environment. In a cloud environment, the vector store 210 has the scalability of cloud services provided by platforms (e.g., AWS™, Azure™). Storing the vector store 210 in a cloud environment entails selecting the cloud service, provisioning resources dynamically through the provider's interface or APIs, and configuring networking components for secure communication. Cloud environments allow the vector store 210 to scale storage capacity without the need for manual intervention. As the demand for storage space grows, additional resources can be automatically provisioned to meet the increased workload. Additionally, cloud-based caching modules can be accessed from anywhere with an internet connection, providing convenient access to historical data for users across different locations or devices.

Conversely, in a self-hosted environment, the vector store 210 is stored on a private web server. Deploying the vector store 210 in a self-hosted environment entails setting up the server with the necessary hardware or virtual machines, installing an operating system, and storing the vector store 210. In a self-hosted environment, organizations have full control over the vector store 210, allowing organizations to implement customized security measures and compliance policies tailored to the organization's specific needs. For example, organizations in industries with strict data privacy and security regulations, such as finance institutions, can mitigate security risks by storing the vector store 210 in a self-hosted environment.

The validation engine 212 accesses the guidelines 202 from the vector store 210 to initiate the compliance assessment. The validation engine 212 can establish a connection to the vector store 210 using appropriate APIs or database drivers. The connection allows the validation engine 212 to query the vector store 210 and retrieve the relevant guidelines for the AI application under evaluation. Frequently accessed guidelines 202 are stored in memory, which allows the validation engine 212 to reduce latency and improve response times for compliance assessment tasks.

In some implementations, only the relevant guidelines are retrieved based on the specific AI application under evaluation. For example, metadata tags, categories, or keywords associated with the AI application can be used to filter the guidelines 202. Example methods of identifying relevant guidelines 202 are discussed further in FIG. 3.

The validation engine 212 evaluates the AI application's compliance with the retrieved guidelines 202, (e.g., using semantic search, pattern recognition, and machine learning techniques). For example, the validation engine 212 compares the vector representations of the different explanations and outcomes by calculating the cosine of the angle between the two vectors indicating the vectors' directional similarity. Similarly, for comparing explanations, the validation engine 212 can measure the intersection over the union of the sets of words in the expected and case-specific explanations. Further evaluation techniques in determining compliance of AI applications are discussed with reference to FIG. 6.

Figure 3:
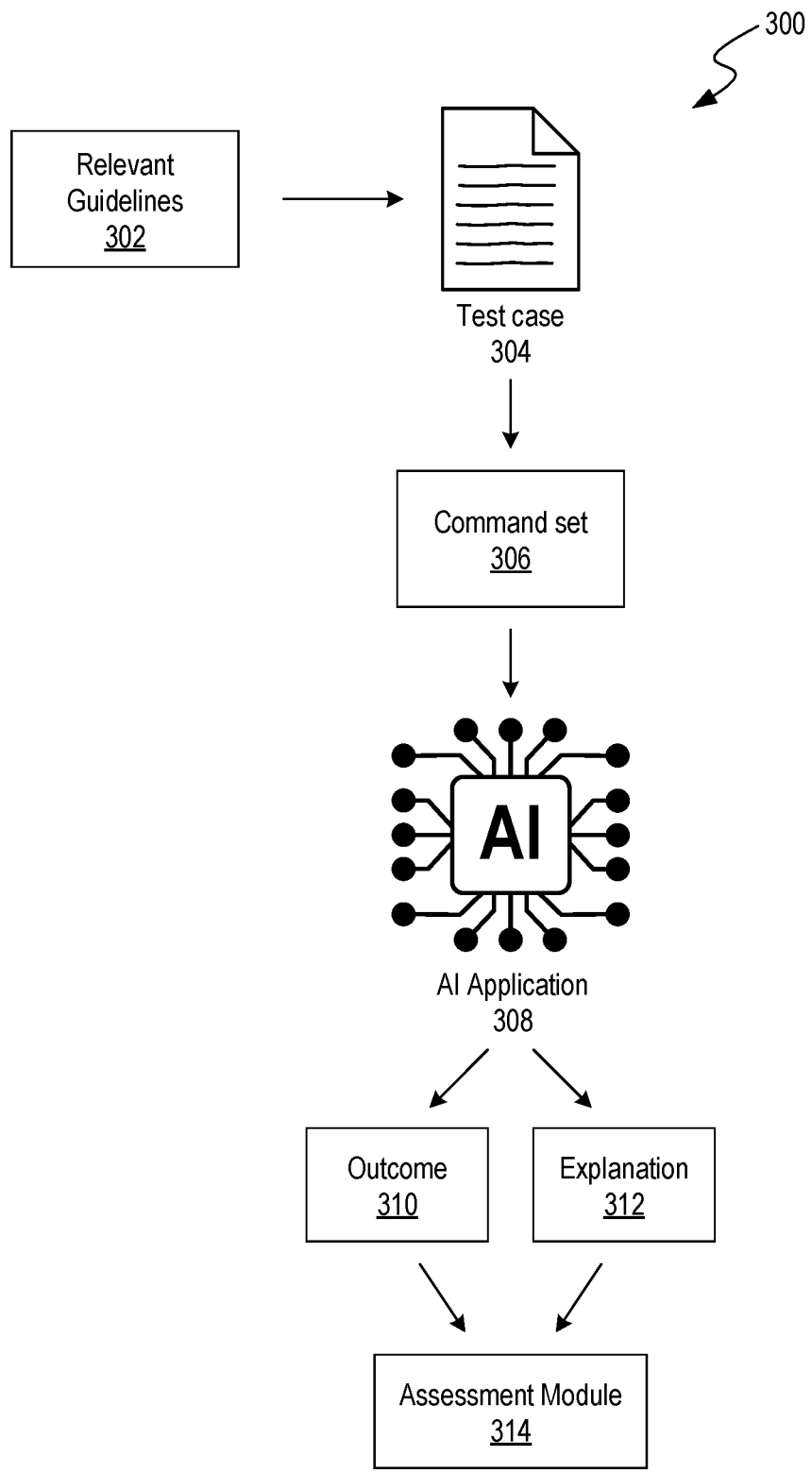
FIG. 3 is a block diagram illustrating an example environment using test cases derived from the guidelines to determine AI compliance, in accordance with some implementations of the present technology.

FIG. 3 is a block diagram illustrating an example environment 300 using test cases derived from the guidelines to determine AI compliance, in accordance with some implementations of the present technology. Environment 300 includes relevant guidelines 302, test case 304, command set 306, AI application 308, outcome 310, explanation 312, and assessment module 314. Guidelines 302 can be any of the guidelines 102 illustrated and described in more detail with reference to FIG. 1. Example outcomes 310 and explanations 312 of the AI application are discussed further in FIG. 1. AI application 308 and assessment module 314 are implemented using components of example computer system 800 illustrated and described in more detail with reference to FIG. 8. Likewise, embodiments of example environment 300 can include different and/or additional components or can be connected in different ways.

The relevant guidelines 302 can be specifically selected based on the specific context and requirements of the AI application being evaluated. For example, the system analyzes metadata tags, keywords, or categories associated with the guidelines 302 stored in the system's database. Using the specific context and requirements of the AI application, 308 the system filters and retrieves the relevant guidelines 302 from the database.

Various filters can be used to select relevant guidelines 302. In some implementations, the system uses natural language processing (NLP) to parse through the text of the guidelines and identify key terms, phrases, and clauses that denote regulatory obligations relevant to the AI application's domain. The specific terms related to the AI application's domain can be predefined and include, for example, "patient privacy" for healthcare sector applications. Using the specific terms related to the AI application's domain as a filter, the system can filter out the non-relevant guidelines.

In some embodiments, the guidelines are stored in vector space. Further methods of storing the guidelines 302 in vector space are discussed in FIG. 2. To identify the relevant guidelines 302 from the guidelines, the system can determine the specific terms to use as filters by calculating the similarity between vectors representing domain-specific terms (e.g., "healthcare") and vectors representing other terms related to the domain (e.g., "patient privacy"), domain-specific terms can be identified based on the proximity of the other terms to known terms of interest. A similarity threshold can be applied to filter out terms that are not sufficiently similar to known domain-specific terms.

In some implementations, the system can tag relevant guidelines 302 with attributes that help contextualize the relevant guidelines 302. The tags serve as markers that categorize and organize the guidelines based on predefined criteria, such as regulatory topics (e.g., data privacy, fairness, transparency) or jurisdictional relevance (e.g., regional regulations, industry standards). The tags provide a structured representation of the guidelines and allow for easier retrieval, manipulation, and analysis of regulatory content. The tags and associated metadata can be stored in a structured format, such as a database, where each guideline 302 is linked to the guideline's 302 corresponding tags and regulatory provisions. Additionally, the guidelines 302 can be represented in a vector space model, where each guideline is mapped to a high-dimensional vector representing the guideline's 302 semantic features and relationships with other guidelines.

The relevant guidelines 302 are used to construct test cases 304 which can include prompts that represent real-world scenarios, along with expected outcomes and explanations. In some implementations, the prompt can specify the guidelines to be considered when generating the expected outcomes and explanations. For example, when the prompt comprises a question related to whether a certain action complies with organizational regulations, the prompt indicates to the system to select/target guidelines defined by the organizational regulations. The prompt from the test case 304 operates as a command set 306, which operates as the input for the AI application 308. Once the command set 306 is generated, the command set 306 is used as input for the AI application 308, which processes the commands and generates outcomes 310 and explanations 312 based on the AI application's 308 internal decision-making processes. Example outcomes and expected explanations of the AI application 308 are discussed further in FIG. 1. The test cases' 304 expected outcomes can include a set of alphanumeric characters. The expected explanation in the corresponding test case can include a set of descriptors associated with a series of steps taken to arrive at the expected outcome (e.g., result). The descriptors provide insights into the expected decision-making process, such as the factors considered, the data utilized, and the reasoning behind the decision. The descriptors can encompass various elements such as feature importance rankings, decision paths, confidence scores, or probabilistic estimates associated with different outcomes.

The AI application 308 processes the command set and generates an outcome 310 and explanation 312 on how the outcome 310 was determined based on the AI application's 308 internal algorithms and decision-making processes. The outcome 310 and explanation 312 are evaluated by the assessment module 314, which compares the outcome 310 and explanation 312 against the expected outcomes and explanations specified in the test case 304 derived from the relevant guidelines 302. Methods of evaluating the AI application 308's compliance with the relevant guidelines 302 are discussed in further detail with references to FIG. 2 and FIG. 6. Any discrepancies or deviations between the observed and expected behavior are flagged as potential compliance issues, warranting further investigation or corrective action. The discrepancies or deviations can be transmitted as an alert to persons to validate the engine's performance.

Figure 4:
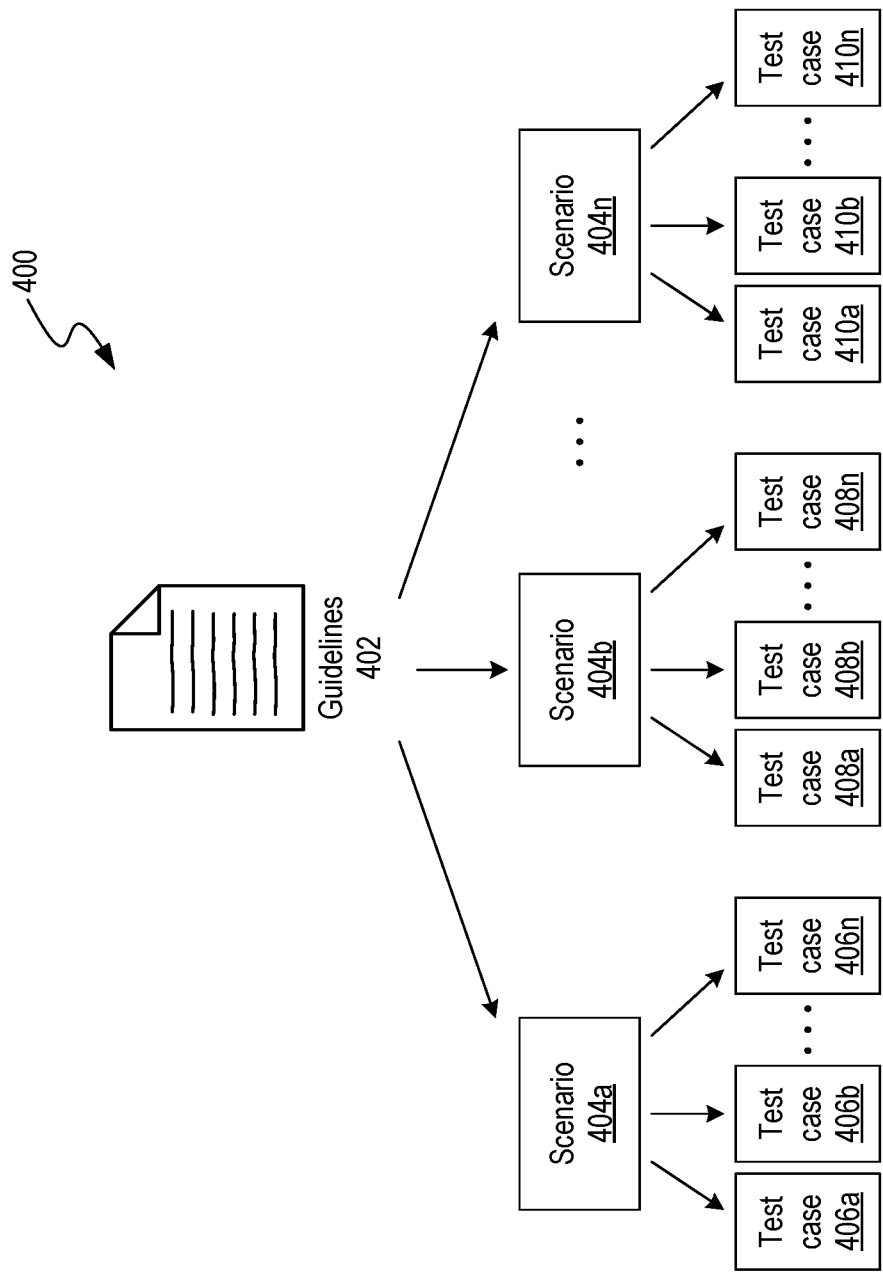
FIG. 4 is a block diagram illustrating an example environment generating test cases from the guidelines, in accordance with some implementations of the present technology.

FIG. 4 is a block diagram illustrating an example environment 400 generating test cases from the guidelines, in accordance with some implementations of the present technology. Environment 400 includes guidelines 402, scenarios 404*a-n*, and test cases 406*a-n*, 408*a-n*, and 410*a-n*. Guidelines 402 can be any of guidelines 102 illustrated and described in more detail with reference to FIG. 1. Test cases 406*a-n*, 408*a-n*, and 410*a-n* can be any of test case 304 illustrated and described in more detail with reference to FIG. 3. Likewise, embodiments of example environment 400 can include different and/or additional components or can be connected in different ways.

Guidelines 402 are extracted from regulatory documents and organizational policies and stored in a vector space for efficient retrieval and processing. Documents are translated into a structured format, such as Gherkin. Gherkin is a human-readable language, so translating the guidelines into Gherkin format helps standardize the specifications' representation and makes the specifications more accessible in the compliance assessment process. The translated guidelines can be transformed and stored in the vector stores.

Guidelines 402 is split into different scenarios 404*a-n*, for a total of n scenarios, where each scenario 404 represents a specific topic outlined in the guidelines. For example, regulatory documents contain provisions covering various topics such as data privacy, fairness, transparency, and accountability, each of which can be a scenario 404. The scenarios 404 serve as the basis for constructing test cases that encompass a range of possible inputs, outputs, and outcomes.

The system can define scenarios 404*a-n* based on predefined rules or criteria derived from the guidelines 402. The rules or criteria can be defined manually by users or generated automatically using machine learning techniques. The system can parse through the guidelines 402 to extract information that matches the predefined rules or criteria. For example, if the guidelines 402 specify certain conditions or constraints for data privacy or model fairness, the system identifies sections or passages in the guidelines 402 that address the corresponding aspects. After identifying the relevant sections or passages of the guidelines (discussed further in FIG. 3), the system groups them into distinct scenarios 404 based on common themes or topics. Each scenario 404 represents a specific aspect or requirement outlined in the guidelines 402. For instance, if the guidelines 402 cover topics such as data privacy, model transparency, and algorithmic fairness, the system creates scenarios 404 corresponding to each of these topics.

Machine learning techniques can be applied to identify patterns or clusters within the guidelines and automatically categorize the guidelines 402 into relevant scenarios 404 based on similarity or relevance. Natural Language Processing (NLP) techniques can be used to identify the scenarios 404 from the guidelines 402. The system can use named entity recognition (NER), in some implementations, to identify specific terms, phrases, or clauses within the guidelines 402 that pertain to different scenarios 404. For example, NER can be used to identify mentions of "data privacy," "fairness," "transparency," "accountability," or other terms of interest within the guidelines 402. By recognizing the named entities, the system can categorize the guidelines 402 into different scenarios 404. In some implementations, sentiment analysis can be applied to assess the tone and sentiment of the guidelines 402 towards each scenario 404, allowing the system to understand whether a particular provision of the guideline 402 is framed as a requirement, recommendation, or prohibition. For example, sentiment analysis can determine whether a guideline 402 related to data privacy imposes strict obligations on data controllers or merely provides guidelines for best practices. Syntactic parsing can be used by the system to analyze the grammatical structure within the guidelines 402 and extract information that helps the system categorize the guidelines 402 into scenarios 404. For example, by parsing the syntax of regulatory provisions, the system can identify relationships between different compliance requirements in the guidelines 402 and determine the scope and applicability of each provision.

In some implementations, clustering algorithms, such as k-means or hierarchical clustering, can be used to identify scenarios 404 based on the guideline's 402 content or features by partitioning the guideline 402 into clusters, where the content within each cluster are more similar to each other than the content in different clusters. After clustering the content within guideline 402, the system can assign each cluster to a relevant scenario 404 based on the cluster's content or theme. For example, if a cluster predominantly discusses data privacy regulations, the cluster is assigned to a scenario 404 related to data privacy compliance.

In some implementations, deep learning techniques (e.g., recurrent neural networks (RNNs)) are used to learn latent representations of the guideline 402 and automatically cluster the guideline 402 based on learned representations. In some implementations, ensemble learning techniques, such as Random Forests or Gradient Boosting Machines (GBMs), are used to combine multiple clustering algorithms or models to improve the accuracy of the clustering process by aggregating the predictions of multiple base models to produce a final clustering solution, which can be more reliable than individual models alone.

Within each scenario 404, the scenario 404 is further divided into individual test cases 406a-n, for a total of n test cases, where each test case 406 is designed to evaluate a particular aspect or requirement specified in the scenario 404, allowing for thorough testing of AI applications against the set of criteria outlined in the guidelines. For example, if a scenario 404 relates to data privacy regulations, individual test cases 406 can focus on aspects such as data encryption, user consent mechanisms, or data retention policies. The test cases 406 can include prompts, expected outcomes, and expected explanations. The prompts provide inputs to the AI application under test, while the expected outcomes specify the desired responses or actions expected from the AI application. The expected explanations articulate the rationale or reasoning behind the expected outcomes. Example expected outcomes and expected explanations of the test cases 406 are discussed further in FIG. 3. Some guidelines 402 may not directly translate into scenarios 404 or test cases 406, requiring the use of glue code or other validation techniques to bridge the gap. The glue code operates as the intermediary code or script that implements custom logic or algorithms to translate abstract guidelines into concrete test cases. For instance, if a guideline 402 emphasizes "Ensuring fairness in algorithmic decision-making," the glue code extracts relevant features from the AI model's decision-making process, such as demographic information or historical data. The glue code assesses fairness metrics, like disparate impact or demographic parity to bridge the gap between abstract guidelines and actionable evaluations.

Figure 5:
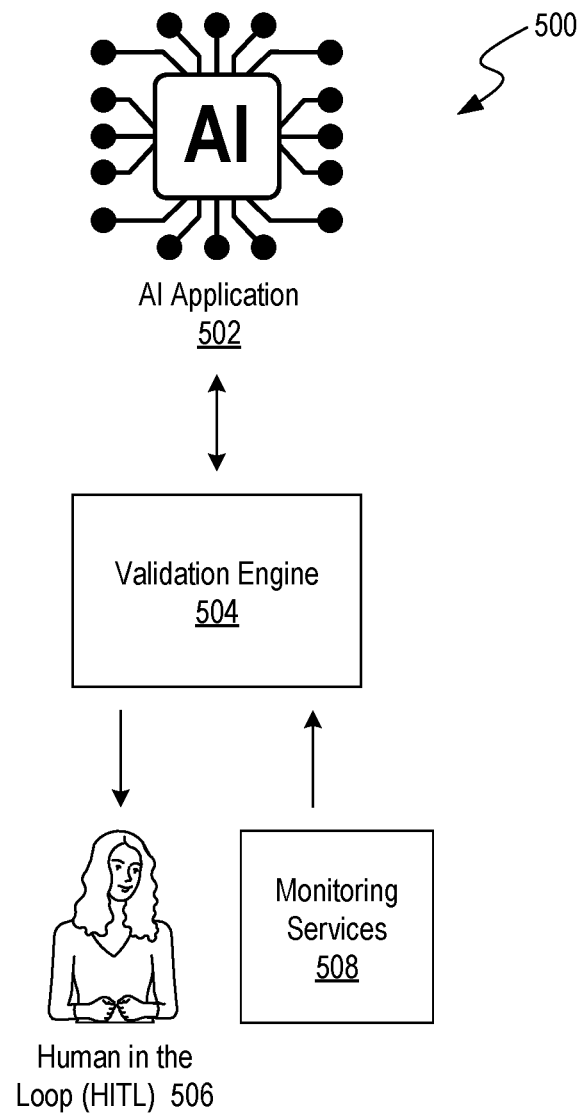
FIG. 5 is a block diagram illustrating an example environment monitoring the validation engine for determining AI compliance, in accordance with some implementations of the present technology.

FIG. 5 is a block diagram illustrating an example environment 500 monitoring the validation engine for determining AI compliance, in accordance with some implementations of the present technology. Environment 500 includes AI application 502, validation engine 504, human-in-the-loop (HITL) validation 506, and monitoring services 508. Validation engine 504 is the same as or similar to validation engine 104 illustrated and described in more detail with reference to FIG. 1. Validation engine 504 is implemented using components of example computer system 800 illustrated and described in more detail with reference to FIG. 8. Likewise, embodiments of example environment 500 can include different and/or additional components or can be connected in different ways.

The AI application 502 generates outputs based on input data and internal algorithms. These outputs are fed into the validation engine 504, which employs algorithms and validation scripts to assess the compliance of the AI model in the AI application 502 with predefined guidelines and criteria (e.g., test cases 406a-n, 408a-n, and 410a-n in FIG. 4). Methods of evaluating the AI application 502's compliance with the predefined guidelines and criteria are discussed in further detail with references to FIG. 2 and FIG. 6. In some implementations, to further validate the AI application 502, the system includes HITL validation 506, where users review the assessment results, identify any discrepancies or ambiguities, and provide feedback to improve the validation process.

HITL validation 506 allows users to provide feedback and annotations on the validation engine's 504 conclusions and recommendations, assessing the validation engine 504 for accuracy, fairness, and/or ethical compliance. The user feedback helps further ensure the AI application's 502 compliance with regulatory requirements. In some implementations, the system includes user interfaces and feedback mechanisms that allow users to review the validation engine's 504 conclusions and recommendations. For example, the system can include dashboard interfaces for visualizing the validation engine 504's outputs, annotation tools for highlighting potential issues, and communication channels between users for adjusting the operational parameters of the validation engine 504.

Monitoring services 508 are used, in some implementations, to continuously monitor the validation engine's 504 performance and correctness. Monitoring services 508 track the validation process in real-time, identifying any anomalies or deviations from expected behavior. If discrepancies are detected, corrective actions can be taken to adjust the validation engine's 504 operational parameters to ensure a reliable assessment of AI compliance. Monitoring services 508 use metrics and alerts to flag any deviations or anomalies, which can be used to determine and/or implement corrective actions. In some implementations, the system incorporates automated corrective actions that can be triggered in response to detected anomalies. The corrective actions can include adjusting the operational parameters of the validation engine 504, such as tuning validation thresholds, updating validation scripts, or scaling resources to handle increased validation workload. In some implementations, the monitoring services 508 uses rule-based approaches to flag deviations or anomalies based on predefined thresholds or criteria. For example, if the validation throughput drops below a certain threshold or the error rate exceeds a predefined limit, the monitoring services 508 triggers alerts indicating potential issues.

Figure 6:
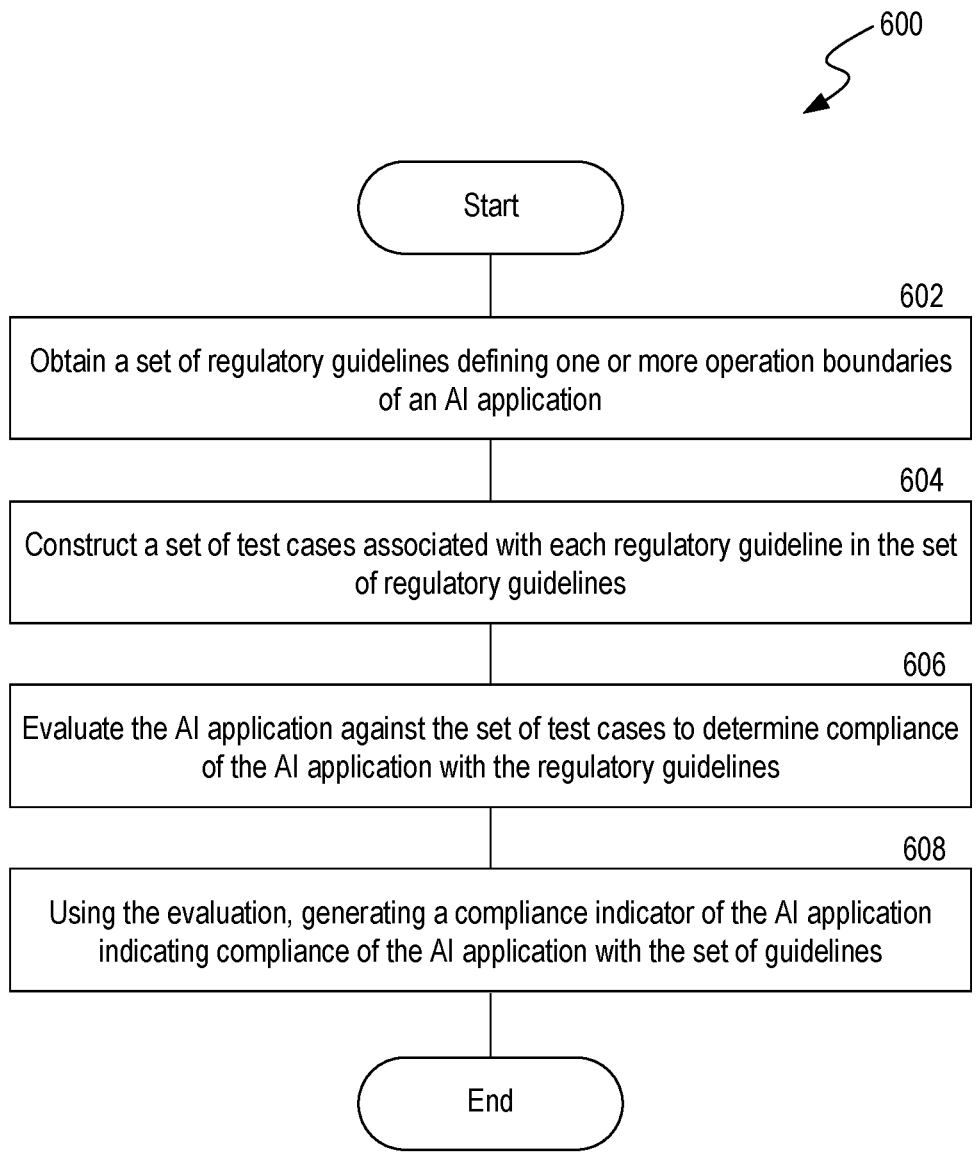
FIG. 6 is a flowchart depicting an example method of determining AI compliance, in accordance with some implementations of the present technology.

FIG. 6 is a flowchart depicting an example method 600 of determining AI compliance, in accordance with some implementations of the present technology. In some implementations, the process is performed by a computer system, e.g., example computer system 800 illustrated and described in more detail with reference to FIG. 8. Particular entities, for example, AI application 106 are illustrated and described in more detail with reference to FIG. 1. Likewise, implementations can include different and/or additional steps or can perform the steps in different orders.

In step 602, the system obtains a set of regulatory guidelines defining one or more operation boundaries of an AI application. The guidelines include regulatory documents, organizational policies, and industry standards relevant to the domain of the AI application. Example guidelines are further discussed with reference to FIG. 2. The system can obtain the guidelines from various sources such as regulatory databases, legal repositories, or API-enabled platforms that provide access to up-to-date regulatory information, as further described with reference to FIG. 1. The system can identify key requirements, constraints, and prohibitions specified in the guidelines, which serve as the basis for defining the operation boundaries of the AI application. In some implementations, the system uses machine learning algorithms to automatically categorize and prioritize the regulatory guidelines based on their relevance and impact on the AI application's operations. Example methods of identifying relevant guidelines and tagging the guidelines are discussed further in FIG. 3. Thus, the system focuses on the most critical guidelines first when generating the operation boundaries. The system can employ rule-based logic to interpret and translate abstract regulatory requirements into specific operational constraints for the AI application. In some implementations, the system receives an indicator of a type of application associated with the AI application and directs an intermediate AI application to identify relevant guidelines (e.g., via an Application Programming Interface (API)) associated with the type of application. The system stores the regulatory guidelines in a vector space representation. Methods of storing the guidelines are described in further detail with reference to FIG. 2. The AI application generates, in response to a received input, an outcome and an explanation of how the outcome was determined. Example outcomes and explanations of the AI application are discussed further in FIG. 1.

In some implementations, the system updates the set of guidelines based on feedback or changes in regulatory requirements. The system parses and analyzes the content of regulatory documents or user feedback to identify changes or new requirements that need to be incorporated into the set of guidelines. Once the updates are identified, the system adds new regulations, revising existing guidelines, or removing outdated or irrelevant rules. The system updates the set of test cases derived from the guidelines to reflect the changes. The system can create new test cases to cover newly introduced regulations or modify existing test cases to align with revised guidelines. In some implementations, the system re-evaluates the AI application against the updated set of guidelines to ensure compliance by running the AI application through the updated test cases and assessing the AI application's outcomes and explanations against the revised criteria.

In step 604, the system constructs a set of test cases associated with each regulatory guideline in the set of regulatory guidelines. Each test case maps to a specific scenario derived from the regulatory guideline and tests the operation boundaries of the regulatory guideline. Each test case includes: (1) a prompt, (2) an expected outcome, and/or (3) an expected explanation. To generate the test cases, the system partitions the regulatory guidelines into scenarios that represent a particular feature of a corresponding guideline. The system partitions each scenario into a set of test cases that test the operation boundaries of a corresponding scenario. Example methods of generating test cases from the guidelines are further described with reference to FIG. 4. Example expected outcomes and expected explanations of the test cases are discussed further in FIG. 3.

In step 606, the system evaluates the AI application against the set of test cases to determine compliance of the AI application with the regulatory guidelines by applying a particular test case in the set of test cases to the AI application. The system supplies the prompt of the particular test case to the AI application. Responsive to inputting the prompt, the system receives, from the AI application, a case-specific outcome and a corresponding case-specific explanation of the case-specific outcome. The system compares the expected outcome of the particular test case to the case-specific outcome received from the AI application. Responsive to the expected outcome of the particular test case satisfying the case-specific outcome received from the AI application, the system compares the expected explanation of the particular test case to the corresponding case-specific explanation of the case-specific outcome.

The system can extract a set of features representative of the set of guidelines using linguistic patterns, semantic cues, and/or contextual information of each guideline, and generates the set of test cases of each guideline using the set of features. For example, if one of the regulatory guidelines mandates that user data must be anonymized before processing, the system identifies keywords and phrases indicative of anonymization requirements, such as "anonymize" or "mask." Semantic cues help the system understand the meaning behind these terms, recognizing synonyms or related concepts that convey similar requirements.

To evaluate the AI application's outcome and explanation, the system can quantify a degree of similarity between 1) the expected outcome and the case-specific outcome and 2) the expected explanation of the particular test case to the corresponding case-specific explanation of the case-specific outcome. Using the degree of similarity, the system generates the compliance indicator indicating the degree of similarity exceeding a predefined threshold. In some implementations, the system can adjust the predefined threshold for similarity based on specific requirements and the complexity of the guidelines being evaluated. For instance, guidelines with stringent compliance requirements may warrant a higher similarity threshold to ensure a more rigorous assessment.

The system can use semantic search techniques through natural language processing (NLP) algorithms to understand the meaning and context of the explanations and outcomes of the AI application and compare the explanations and outcomes of the AI application with the expected explanations and expected outcomes of the test case. In some embodiments, the textual data in the explanations and outcomes of the AI application can be tokenized by word, phrase, and/or characters. For example, in the sentence "The quick brown fox jumped," the word tokens would be "The," "quick," "brown," "fox," and "jumped." In some implementations, the textual data in the explanations and outcomes of the AI application can be broken down into vector representations of the alphanumeric characters. Once the textual data is vectorized, the system can extract the semantic meaning of each vector and understand the vector's context within the sentence and document. For example, word embedding models (e.g., Word2Vec, GloVe) can be used to capture the semantic relationships between words and phrases. The models can map words to high-dimensional vector representations, where similar words are closer together in vector space.

The semantic representations of the AI application's explanations and outcomes are compared with the expected outcomes specified in the test cases. The validation engine can align the vector representations of the tokens in the AI application's explanations and outcomes with those of the expected explanations and expected outcomes. The validation engine identifies similarities and differences between the two sets of vector representations, highlighting areas where the AI application's behavior diverges from the expected explanations and expected outcomes specified in the test cases. Similarity metrics, such as cosine similarity or Jaccard similarity, can be used to quantify the similarity between the AI application's behavior and the expected outcomes. For example, cosine similarity can measure the cosine of the angle between two vector representations in vector space, whereas Jaccard similarity can measure the similarity between sets of tokens (e.g., the set of tokens of the explanation and/or outcome of the AI application, and the set of tokens of the expected explanation and/or expected outcome of the test case) by comparing the intersection and union of the tokens within each set and quantify the degree of overlap or similarity between the sets based on their shared vocabulary. The similarity metrics provide numerical measures of how closely the AI application's behavior aligns with the expected outcomes specified in the test cases, providing quantitative assessments of compliance.

Pattern recognition algorithms can identify recurring patterns or structures in the guidelines and match the patterns against corresponding patterns in the AI application's behavior. Through feature extraction, relevant attributes such as keywords, phrases, or clauses denoting regulatory obligations can be isolated from the guidelines. Further feature extraction techniques are discussed with reference to FIG. 4. Once the features are extracted, the validation engine can match the features against corresponding patterns or structures within the behavior of the explanation and/or outcome of the AI application. For example, the AI application's outcomes or explanations can be evaluated to identify instances where the AI application adheres to or diverges from the expected patterns outlined in the guidelines. Any deviations from the expected patterns can be flagged as potential compliance issues, prompting further investigation. For example, the validation engine can identify phrases such as "prohibited from considering race or gender" or "must provide adverse action notices" and use the phrases as reference points for evaluating the AI application's behavior. However, if it is observed that the AI application's outcomes or explanations consistently assign lower credit scores to applicants from specific racial groups, even when their financial profiles are similar to those of other applicants, or that the AI application's outcomes or explanations inadvertently incorporates zip codes as a proxy for race, as certain zip codes are associated with predominantly minority populations, the validation engine can identify that, through the AI algorithm does not explicitly consider race or ethnicity, the inclusion of zip codes results in discriminatory outcomes and violates the regulatory guidelines.

Machine learning techniques, such as classification or regression, can be trained on labeled data to predict the compliance of the AI application with specific guidelines based on historical examples. For example, one or more custom models are trained on labeled datasets where each data point is an instance of an AI application's interaction with specific guidelines. The labels can indicate different levels of compliance (e.g., compliant, partially compliant, non-compliant), which are determined based on historical compliance data. As another example, the system utilizes Natural Language Processing (NLP) techniques to analyze and understand regulatory documents. This process helps in defining the granularity of the rules and guidelines. NLP techniques parse and interpret the text of regulatory documents, extracting key criteria and stipulations which form the basis for compliance checks.

The system enables customized storage of the compliance results, based on, for example, the domain of the guidelines, the domain of the application, geographic indicators associated with the guidelines (e.g., geographical applicability of guidelines), and do on. Storing compliance results in a structured and accessible manner is crucial for efficient management and retrieval, necessary for audits, regulatory reviews, and internal assessments across various industries. For example, in financial services, compliance results for credit decisions are stored in a relational database due to the structured nature of the data. Each record can detail compliance with specific regulations like the FCRA and ECOA, including applicant ID, decision date, and compliance status. This allows for complex queries by compliance officers during audits or real-time checks. In healthcare, a NoSQL database might be used to store HIPAA compliance data due to its flexibility with varied data types. Records would typically summarize each patient interaction or data handling event, including details like patient ID, interaction type, and compliance status. This is accessed regularly for audits, updating security protocols, and consent management. For environmental compliance, a time-series database is effective for managing data related to environmental assessments like air or water quality. It allows for efficient querying of time-stamped data and is often accessed for generating reports or historical data analysis. Key considerations for all sectors include ensuring data security through encryption and access controls, maintaining data integrity with mechanisms like checksums and audit logs. These measures ensure that compliance data is secure, reliable, and ready for any necessary review or operational need.

In step 608, the system generates a compliance indicator of the AI application indicating compliance of the AI application with the set of guidelines. The system, using the evaluation, generates a first indicator of the AI application indicating compliance of the AI application with the regulatory guidelines using the comparison between the expected outcome of the particular test case and the case-specific outcome received from the AI application. The system, using the evaluation, generates a second indicator of the AI application indicating compliance of the AI application with the set of regulatory guidelines using the comparison between the expected explanation of the particular test case and the corresponding case-specific explanation of the case-specific outcome.

Using the first indicator and the second indicator, the system can generate a modification plan associated with the AI application. Implementing the modification plan aligns 1) the expected outcome of the particular test case with the case-specific outcome received from the AI application and 2) the expected explanation of the particular test case with the corresponding case-specific explanation of the case-specific outcome. In some implementations, the system uses a supervised learning approach where historical data on compliance assessments, including the first and second indicators, serve as training data. The machine learning model learns to identify patterns in discrepancies and formulate modification strategies to mitigate the discrepancies. In some implementations, the system uses predefined logic and decision-making rules to determine appropriate modifications based on the observed discrepancies. If the discrepancy between expected and observed outcomes exceeds a certain threshold or satisfies certain criteria, the rule-based system recommends specific adjustments to the AI model's decision-making processes or input data preprocessing methods in accordance with the predefined rules. In some implementations, a model can be trained with supervised learning techniques. The model can be provided with historical data, where past instances of non-compliance and corresponding corrective actions are labeled. The models learn to recognize patterns in the data and predict appropriate corrective actions based on the observed patterns. Further discussion of Artificial Intelligence and training methods are discussed in FIG. 7. In some embodiments, the severity and impact of each non-compliance issue are considered, including factors such as regulatory implications, potential risks, and resource constraints.

In some implementations, in response to detecting non-compliance of the AI application with the set of guidelines, the system automatically adjusts the parameters of the AI application to align the AI application with the operation boundaries in the set of guidelines.

The compliance indicator can include an indicator indicating non-compliant areas in the set of guidelines. For example, each guideline can be assigned a binary indicator representing compliance (1) or non-compliance (0). During the evaluation process, if the AI application fails to meet the criteria specified in a particular guideline, the corresponding indicator is set to indicate non-compliance. In some implementations, the compliance indicator can use a categorical scale to quantify the degree of non-compliance for each guideline. Instead of a binary indicator, numerical values ranging from 0 to 1 or another predefined scale could be assigned to indicate the extent to which the AI application deviates from the guidelines. In some implementations, the compliance indicator uses contextual information or metadata to provide additional insights into non-compliant areas, such as the frequency or recurrence of non-compliance instances, the impact on overall system performance, and/or the potential risks associated with deviations from the guidelines.

The system can present and display a visual or textual representation of the compliance indicator indicating a degree of compliance and identified discrepancies between 1) the expected outcome of the particular test case to the case-specific outcome received from the AI application and 2) the expected explanation of the particular test case to the corresponding case-specific explanation of the case-specific outcome. For example, a bar chart can visualize the compliance scores for each guideline with color-coded bars indicating the level of compliance (e.g., green for compliant, yellow for partially compliant, and red for non-compliant). The system can generate compliance reports or summaries that outline the results of the evaluation process in a structured and informative manner. For instance, the system produces a compliance report listing each test case, the test case's expected outcome and explanation, the corresponding case-specific outcome and explanation from the AI application, and any discrepancies detected.

The system can assign an individual score to represent the AI application's compliance with each guideline. The individual score reflects a degree of alignment and compliance between 1) the expected outcome of the particular test case to the case-specific outcome received from the AI application and/or 2) the expected explanation of the particular test case to the corresponding case-specific explanation of the case-specific outcome. The system aggregates the individual scores to generate an overall compliance score for the AI application. For example, the system can assign a numerical score to each test case, with higher scores indicating greater alignment and compliance with the guidelines. In some implementations, the system uses a binary scoring approach, where each test case is classified as either compliant or non-compliant based on predefined criteria. In some implementations, the system quantifies the likelihood or probability of compliance for each test case by calculating a probability score indicating the likelihood that the observed outcome and explanation align with the expected outcome and explanation. In some implementations, the system uses weighted scoring on the individual scores to prioritize certain guidelines or test cases over others based on the guidelines' relative importance or criticality. For example, guidelines related to ethical considerations or regulatory requirements can be assigned higher weights to reflect the requirement's heightened significance in the compliance assessment process. The weighted scoring ensures that the overall compliance score accurately reflects the relative importance of different guidelines in evaluating the AI application's compliance.

The compliance indicator can be stored in a cloud environment hosted by a cloud provider with scalable resources or a self-hosted environment hosted by a local server. For further details on cloud environments and self-hosted environments, see FIG. 2.

AI System

Figure 7:
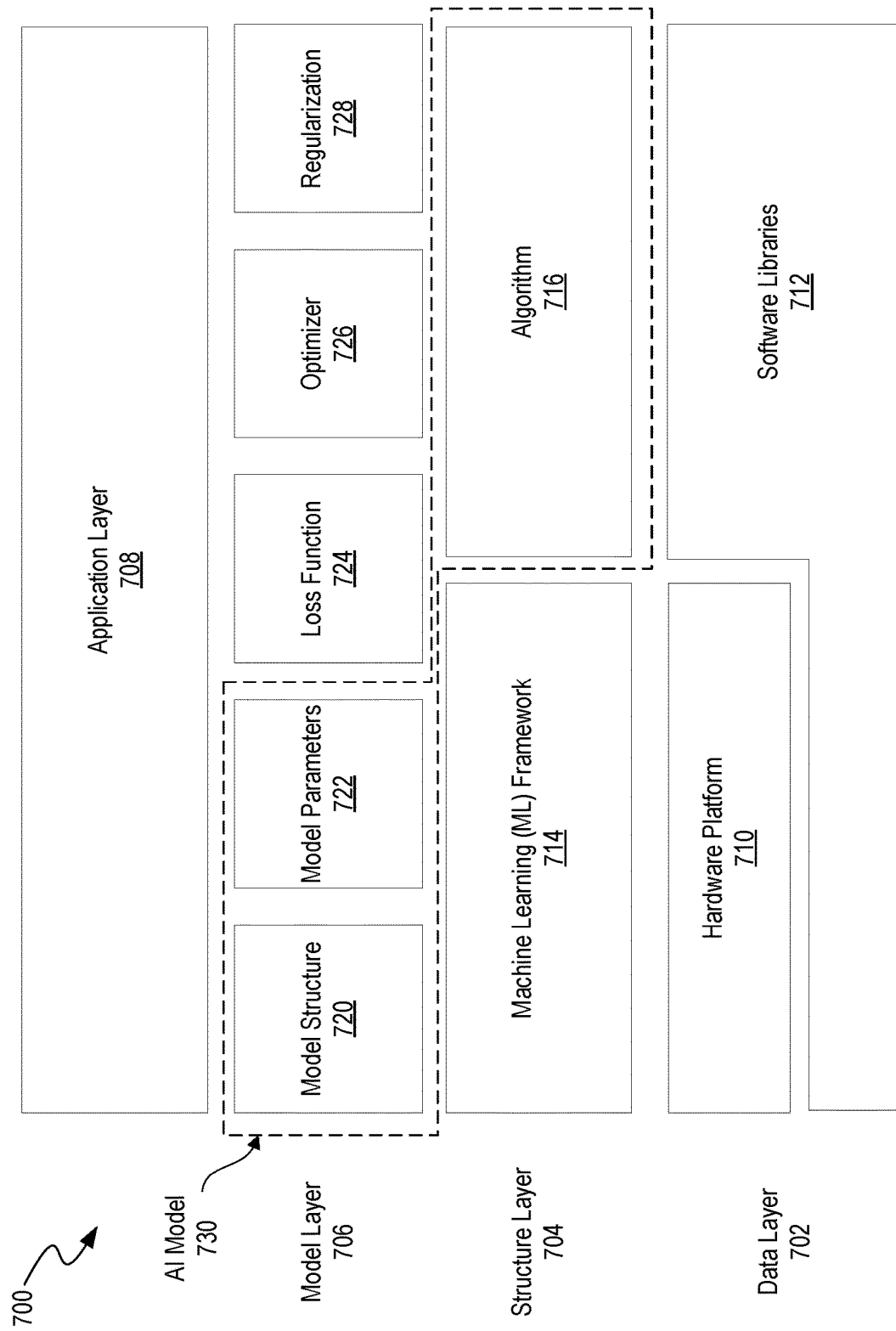
FIG. 7 is a high-level block diagram illustrating an example AI system, in accordance with one or more implementations.

FIG. 7 is a high-level block diagram illustrating an example AI system, in accordance with one or more implementations. The AI system 700 is implemented using components of the example computer system 800 illustrated and described in more detail with reference to FIG. 8. Likewise, implementations of the AI system 700 include different and/or additional components or be connected in different ways.

In some implementations, as shown in FIG. 7, the AI system 700 includes a set of layers, which conceptually organize elements within an example network topology for the AI system's architecture to implement a particular AI model 730. Generally, an AI model 730 is a computer-executable program implemented by the AI system 700 that analyses data to make predictions. Information passes through each layer of the AI system 700 to generate outputs for the AI model 730. The layers include a data layer 702, a structure layer 704, a model layer 706, and an application layer 708. The algorithm 716 of the structure layer 704 and the model structure 720 and model parameters 722 of the model layer 706 together form the example AI model 730. The optimizer 726, loss function engine 724, and regularization engine 728 work to refine and optimize the AI model 730, and the data layer 702 provides resources and support for the application of the AI model 730 by the application layer 708.

The data layer 702 acts as the foundation of the AI system 700 by preparing data for the AI model 730. As shown, in some implementations, the data layer 702 includes two sub-layers: a hardware platform 710 and one or more software libraries 712. The hardware platform 710 is designed to perform operations for the AI model 730 and includes computing resources for storage, memory, logic, and networking, such as the resources described in relation to FIGS. 1-6. The hardware platform 710 processes amounts of data using one or more servers. The servers can perform backend operations such as matrix calculations, parallel calculations, machine learning (ML) training, and the like. Examples of servers used by the hardware platform 710 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 710 includes Infrastructure as a Service (IaaS) resources, which are computing resources, (e.g., servers, memory, etc.) offered by a cloud services provider. In some implementations, the hardware platform 710 includes computer memory for storing data about the AI model 730, application of the AI model 730, and training data for the AI model 730. In some implementations, the computer memory is a form of random-access memory (RAM), such as dynamic RAM, static RAM, and non-volatile RAM.

In some implementations, the software libraries 712 are thought of as suites of data and programming code, including executables, used to control the computing resources of the hardware platform 710. In some implementations, the programming code includes low-level primitives (e.g., fundamental language elements) that form the foundation of one or more low-level programming languages, such that servers of the hardware platform 710 can use the low-level primitives to carry out specific operations. The low-level programming languages do not require much, if any, abstraction from a computing resource's instruction set architecture, allowing them to run quickly with a small memory footprint. Examples of software libraries 712 that can be included in the AI system 700 include Intel Math Kernel Library, Nvidia cuDNN, Eigen, and Open BLAS.

In some implementations, the structure layer 704 includes an ML framework 714 and an algorithm 716. The ML framework 714 can be thought of as an interface, library, or tool that allows users to build and deploy the AI model 780. In some implementations, the ML framework 714 includes an open-source library, an application programming interface (API), a gradient-boosting library, an ensemble method, and/or a deep learning toolkit that works with the layers of the AI system facilitate development of the AI model 730. For example, the ML framework 714 distributes processes for the application or training of the AI model 730 across multiple resources in the hardware platform 710. In some implementations, the ML framework 714 also includes a set of pre-built components that have the functionality to implement and train the AI model 730 and allow users to use pre-built functions and classes to construct and train the AI model 730. Thus, the ML framework 714 can be used to facilitate data engineering, development, hyperparameter tuning, testing, and training for the AI model 730. Examples of ML frameworks 714 that can be used in the AI system 700 include TENSORFLOW, PYTORCH, SCIKIT-LEARN, KERAS, Caffe, LightGBM, Random Forest, and AMAZON WEB SERVICES and JAVASCRIPT.

In some implementations, the algorithm 716 is an organized set of computer-executable operations used to generate output data from a set of input data and can be described using pseudocode. In some implementations, the algorithm 716 includes complex code that allows the computing resources to learn from new input data and create new/modified outputs based on what was learned. In some implementations, the algorithm 716 builds the AI model 730 through being trained while running computing resources of the hardware platform 710. The training allows the algorithm 716 to make predictions or decisions without being explicitly programmed to do so. Once trained, the algorithm 716 runs at the computing resources as part of the AI model 730 to make predictions or decisions, improve computing resource performance, or perform tasks. The algorithm 716 is trained using supervised learning, unsupervised learning, semi-supervised learning, and/or reinforcement learning. The application layer 708 describes how the AI system 700 is used to solve problems or perform tasks.

As an example, to train an AI model 730 that is intended to model human language (also referred to as a language model), the data layer 702 is a collection of text documents, referred to as a text corpus (or simply referred to as a corpus). The corpus represents a language domain (e.g., a single language), a subject domain (e.g., scientific papers), and/or encompasses another domain or domains, be they larger or smaller than a single language or subject domain. For example, a relatively large, multilingual, and non-subject-specific corpus is created by extracting text from online web pages and/or publicly available social media posts. In some implementations, data layer 702 is annotated with ground truth labels (e.g., each data entry in the training dataset is paired with a label), or unlabeled.

Training an AI model 730 generally involves inputting into an AI model 730 (e.g., an untrained ML model) data layer 702 to be processed by the AI model 730, processing the data layer 702 using the AI model 730, collecting the output generated by the AI model 730 (e.g., based on the inputted training data), and comparing the output to a desired set of target values. If the data layer 702 is labeled, the desired target values, in some implementations, are, e.g., the ground truth labels of the data layer 702. If the data layer 702 is unlabeled, the desired target value is, in some implementations, a reconstructed (or otherwise processed) version of the corresponding AI model 730 input (e.g., in the case of an autoencoder), or is a measure of some target observable effect on the environment (e.g., in the case of a reinforcement learning agent). The parameters of the AI model 730 are updated based on a difference between the generated output value and the desired target value. For example, if the value outputted by the AI model 730 is excessively high, the parameters are adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the AI model 730 typically is to minimize a loss function or maximize a reward function.

In some implementations, the data layer 702 is a subset of a larger data set. For example, a data set is split into three mutually exclusive subsets: a training set, a validation (or cross-validation) set, and a testing set. The three subsets of data, in some implementations, are used sequentially during AI model 730 training. For example, the training set is first used to train one or more ML models, each AI model 730, e.g., having a particular architecture, having a particular training procedure, being describable by a set of model hyperparameters, and/or otherwise being varied from the other of the one or more ML models. The validation (or cross-validation) set, in some implementations, is then used as input data into the trained ML models to, e.g., measure the performance of the trained ML models and/or compare performance between them. In some implementations, where hyperparameters are used, a new set of hyperparameters is determined based on the measured performance of one or more of the trained ML models, and the first step of training (i.e., with the training set) begins again on a different ML model described by the new set of determined hyperparameters. These steps are repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) begins in some implementations. The output generated from the testing set, in some implementations, is compared with the corresponding desired target values to give a final assessment of the trained ML model's accuracy. Other segmentations of the larger data set and/or schemes for using the segments for training one or more ML models are possible.

Backpropagation is an algorithm for training an AI model 730. Backpropagation is used to adjust (also referred to as update) the value of the parameters in the AI model 730, with the goal of optimizing the objective function. For example, a defined loss function is calculated by forward propagation of an input to obtain an output of the AI model 730 and a comparison of the output value with the target value. Backpropagation calculates a gradient of the loss function with respect to the parameters of the ML model, and a gradient algorithm (e.g., gradient descent) is used to update (i.e., "learn") the parameters to reduce the loss function. Backpropagation is performed iteratively so that the loss function is converged or minimized. In some implementations, other techniques for learning the parameters of the AI model 730 are used. The process of updating (or learning) the parameters over many iterations is referred to as training. In some implementations, training is carried out iteratively until a convergence condition is met (e.g., a predefined maximum number of iterations has been performed, or the value outputted by the AI model 730 is sufficiently converged with the desired target value), after which the AI model 730 is considered to be sufficiently trained. The values of the learned parameters are then fixed and the AI model 730 is then deployed to generate output in real-world applications (also referred to as "inference").

In some examples, a trained ML model is fine-tuned, meaning that the values of the learned parameters are adjusted slightly in order for the ML model to better model a specific task. Fine-tuning of an AI model 730 typically involves further training the ML model on a number of data samples (which may be smaller in number/cardinality than those used to train the model initially) that closely target the specific task. For example, an AI model 730 for generating natural language that has been trained generically on publicly available text corpora is, e.g., fine-tuned by further training using specific training samples. In some implementations, the specific training samples are used to generate language in a certain style or a certain format. For example, the AI model 730 is trained to generate a blog post having a particular style and structure with a given topic.

Some concepts in ML-based language models are now discussed. It may be noted that, while the term "language model" has been commonly used to refer to a ML-based language model, there could exist non-ML language models. In the present disclosure, the term "language model" may be used as shorthand for an ML-based language model (i.e., a language model that is implemented using a neural network or other ML architecture), unless stated otherwise. For example, unless stated otherwise, the "language model" encompasses LLMs.

In some implementations, the language model uses a neural network (typically a DNN) to perform NLP tasks. A language model is trained to model how words relate to each other in a textual sequence, based on probabilities. In some implementations, the language model contains hundreds of thousands of learned parameters, or in the case of a large language model (LLM) contains millions or billions of learned parameters or more. As non-limiting examples, a language model can generate text, translate text, summarize text, answer questions, write code (e.g., PYTHON, JAVASCRIPT, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

In recent years, there has been interest in a type of neural network architecture, referred to as a transformer, for use as language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models.

Although a general transformer architecture for a language model and the model's theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that is considered to be an encoder-only language model. A decoder-only language model accepts embeddings as input and uses auto-regression to generate an output text sequence. Transformer-XL and GPT-type models are language models that are considered to be decoder-only language models.

Because GPT-type language models tend to have a large number of parameters, these language models are considered LLMs. An example of a GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2,048 input tokens), and is able to generate a large number of tokens as output (e.g., up to 2,048 tokens). GPT-3 has been trained as a generative model, meaning that GPT-3 can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as, for example, the Internet. In some implementations, such as, for example, potentially in the case of a cloud-based language model, a remote language model is hosted by a computer system that includes a plurality of cooperating (e.g., cooperating via a network) computer systems that are in, for example, a distributed arrangement. Notably, a remote language model employs a plurality of processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real-time or near real-time) can require the use of a plurality of processors/cooperating computing devices as discussed above.

In some implementations, inputs to an LLM are referred to as a prompt (e.g., command set or instruction set), which is a natural language input that includes instructions to the LLM to generate a desired output. In some implementations, a computer system generates a prompt that is provided as input to the LLM via the LLM's API. As described above, the prompt is processed or pre-processed into a token sequence prior to being provided as input to the LLM via the LLM's API. A prompt includes one or more examples of the desired output, which provides the LLM with additional information to enable the LLM to generate output according to the desired output. Additionally or alternatively, the examples included in a prompt provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples is referred to as a zero-shot prompt.

In some implementations, the llama2 is used as a large language model, which is a large language model based on an encoder-decoder architecture, and can simultaneously perform text generation and text understanding. The llama2 selects or trains proper pre-training corpus, pre-training targets and pre-training parameters according to different tasks and fields, and adjusts a large language model on the basis so as to improve the performance of the large language model under a specific scene.

In some implementations, the Falcon40B is used as a large language model, which is a causal decoder-only model. During training, the model predicts the subsequent tokens with a causal language modeling task. The model applies rotational positional embeddings in the model's transformer model and encodes the absolution positional information of the tokens into a rotation matrix.

In some implementations, the Claude is used as a large language model, which is an autoregressive model trained on a large text corpus unsupervised.

Computing Platform

Figure 8:
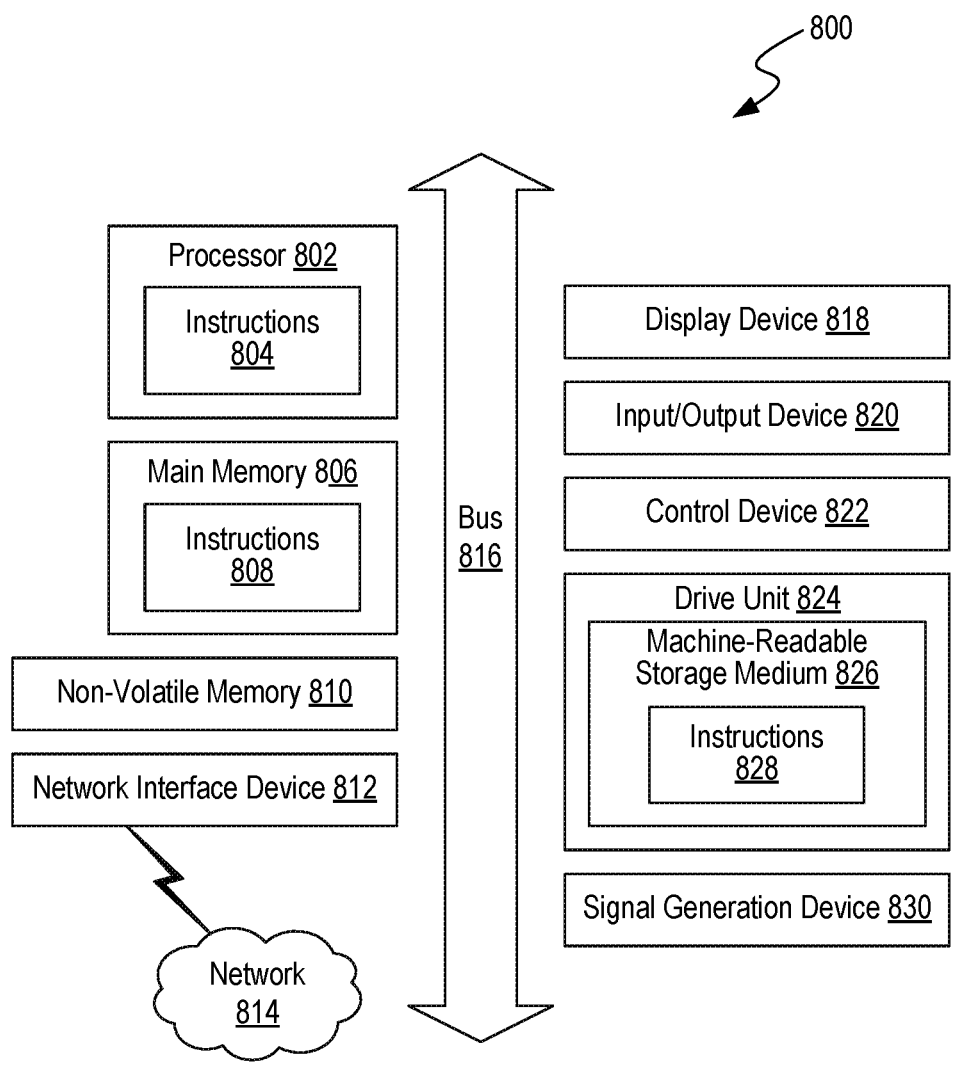
FIG. 8 is a block diagram illustrating an example computer system, in accordance with one or more implementations.

FIG. 8 is a block diagram illustrating an example computer system 800, in accordance with one or more implementations. In some implementations, components of the example computer system 800 are used to implement the software platforms described herein. At least some operations described herein can be implemented on the computer system 800.

In some implementations, the computer system 800 includes one or more central processing units ("processors") 802, main memory 806, non-volatile memory 810, network adapters 812 (e.g., network interface), video displays 818, input/output devices 820, control devices 822 (e.g., keyboard and pointing devices), drive units 824 including a storage medium 826, and a signal generation device 830 that are communicatively connected to a bus 816. The bus 816 is illustrated as an abstraction that represents one or more physical buses and/or point-to-point connections that are connected by appropriate bridges, adapters, or controllers. The bus 816, therefore, includes a system bus, a peripheral component interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 894 bus (also referred to as "Firewire").

In some implementations, the computer system 800 shares a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the computer system 800.

While the main memory 806, non-volatile memory 810, and storage medium 826 (also called a "machine-readable medium") are shown to be a single medium, the terms "machine-readable medium" and "storage medium" should be taken to include a single medium or multiple media (e.g., a centralized/distributed database and/or associated caches and servers) that store one or more sets of instructions 828. The term "machine-readable medium" and "storage medium" shall also be taken to include any medium that is capable of storing, encoding, or carrying a set of instructions for execution by the computer system 800. In some implementations, the non-volatile memory 810 or the storage medium 826 is a non-transitory, computer-readable storage medium storing computer instructions, which is executable by one or more "processors" 802 to perform functions of the implementations disclosed herein.

In general, the routines executed to implement the implementations of the disclosure can be implemented as part of an operating system or a specific application, component, program, object, module, or sequence of instructions (collectively referred to as "computer programs"). The computer programs typically include one or more instructions (e.g., instructions 804, 808, 828) set at various times in various memory and storage devices in a computer device. When read and executed by one or more processors 802, the instruction(s) cause the computer system 800 to perform operations to execute elements involving the various aspects of the disclosure.

Moreover, while implementations have been described in the context of fully functioning computer devices, those skilled in the art will appreciate that the various implementations are capable of being distributed as a program product in a variety of forms. The disclosure applies regardless of the particular type of machine or computer-readable media used to actually affect the distribution.

Further examples of machine-readable storage media, machine-readable media, or computer-readable media include recordable-type media such as volatile and non-volatile memory devices 810, floppy and other removable disks, hard disk drives, optical discs (e.g., compact disc read-only memory (CD-ROMS), digital versatile discs (DVDs)), and transmission-type media such as digital and analog communication links.

The network adapter 812 enables the computer system 800 to mediate data in a network 814 with an entity that is external to the computer system 800 through any communication protocol supported by the computer system 800 and the external entity. The network adapter 812 includes a network adapter card, a wireless network interface card, a router, an access point, a wireless router, a switch, a multilayer switch, a protocol converter, a gateway, a bridge, a bridge router, a hub, a digital media receiver, and/or a repeater.

In some implementations, the network adapter 812 includes a firewall that governs and/or manages permission to access proxy data in a computer network and tracks varying levels of trust between different machines and/or applications. The firewall is any number of modules having any combination of hardware and/or software components able to enforce a predetermined set of access rights between a particular set of machines and applications, machines and machines, and/or applications and applications (e.g., to regulate the flow of traffic and resource sharing between these entities). In some implementations, the firewall additionally manages and/or has access to an access control list that details permissions, including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc. A portion of the methods described herein can be performed using the example ML system 700 illustrated and described in more detail with reference to FIG. 7.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. A computing system comprising:
   at least one processor; and
   one or more non-transitory computer-readable media storing instructions, which when executed by at least one processor, perform operations comprising:
   obtaining a set of guidelines defining one or more operation boundaries of an AI application,
      wherein the AI application is configured to generate, in response to a received input, an outcome and an explanation of the outcome;
   constructing a set of test cases associated with each guideline in the set of guidelines,
      wherein each test case comprises: (1) a prompt, (2) an expected outcome, and (3) an expected explanation, and
      wherein each test case is configured to test the one or more operation boundaries of the guidelines;
   evaluating the AI application against the set of test cases to determine compliance of the AI application with the set of guidelines by:
      supplying a prompt of a particular test case into the AI application,
      receiving, from the AI application, a case-specific outcome and a corresponding case-specific explanation of the case-specific outcome, and
      comparing 1) the expected outcome of the particular test case to the case-specific outcome received from the AI application and 2) the expected explanation of the particular test case to the corresponding case-specific explanation of the case-specific outcome;
   using the evaluation, generating a compliance indicator of the AI application indicating compliance of the AI application with the set of guidelines; and
   automatically adjusting parameters of the AI application based on the evaluation and the compliance indicator, wherein adjusting the parameters of the AI application aligns the AI application within the one or more operation boundaries of the set of guidelines.

2. The computing system of claim 1, further comprising:
presenting a visual or textual representation of the compliance indicator indicating a degree of compliance and identified discrepancies between 1) the expected outcome of the particular test case to the case-specific outcome received from the AI application and 2) the expected explanation of the particular test case to the corresponding case-specific explanation of the case-specific outcome.

3. The computing system of claim 1, further comprising:
assigning an individual score to representing the AI application's compliance with each guideline,
wherein the individual score reflects a degree of alignment between one or more of: 1) the expected outcome of the particular test case to the case-specific outcome received from the AI application or 2) the expected explanation of the particular test case to the corresponding case-specific explanation of the case-specific outcome;
aggregating the individual scores to generate an overall compliance score for the AI application.

4. The computing system of claim 1, wherein the compliance indicator is stored in a cloud environment hosted by a cloud provider with scalable resources or a self-hosted environment hosted by a local server.

5. The computing system of claim 1, wherein comparing 1) the expected outcome of the particular test case to the case-specific outcome received from the AI application and 2) the expected explanation of the particular test case to the corresponding case-specific explanation of the case-specific outcome includes:
quantifying a degree of similarity between 1) the expected outcome and the case-specific outcome and 2) the expected explanation of the particular test case to the corresponding case-specific explanation of the case-specific outcome, and
using the degree of similarity, generating the compliance indicator indicating the degree of similarity exceeding a predefined threshold.

6. A computer-implemented method, comprising:
obtaining a set of guidelines defining one or more operation boundaries of an AI application,
wherein the AI application is configured to generate, in response to a received input, an outcome and an explanation of the outcome;
constructing a set of test cases associated with each guideline in the set of guidelines,
wherein each test case maps to a specific scenario derived from the guidelines,
wherein each test case comprises: (1) a prompt, (2) an expected outcome, and (3) an expected explanation, and
wherein each test case is configured to test the one or more operation boundaries of the guidelines;
evaluating the AI application against the set of test cases to determine compliance of the AI application with the guidelines by applying a particular test case in the set of test cases to the AI application by:
supplying the prompt of the particular test case into the AI application,
responsive to inputting the prompt, receiving, from the AI application, a case-specific outcome and a corresponding case-specific explanation of the case-specific outcome, and
comparing 1) the expected outcome of the particular test case to the case-specific outcome received from the AI application and 2) the expected explanation of the particular test case to the corresponding case-specific explanation of the case-specific outcome; and
using the evaluation, generating a compliance indicator of the AI application indicating compliance of the AI application with the set of guidelines; and
responsive to detecting non-compliance of the AI application with the set of guidelines, automatically adjusting parameters of the AI application to align the AI application with the operation boundaries in the set of guidelines.

7. The computer-implemented method of claim 6, further comprising:
using the compliance indicator, generating a modification plan associated with the AI application,
wherein implementing the modification plan aligns the AI application with the operation boundaries in the set of guidelines.

8. The computer-implemented method of claim 6, wherein evaluating the AI application against the set of test cases further comprises:
extracting a set of features representative of the set of guidelines using one or more of: linguistic patterns, semantic cues, or contextual information of each guideline; and
generating the set of test cases of each guideline using the set of features.

9. The computer-implemented method of claim 6, wherein the compliance indicator comprises an indicator indicating non-compliant areas in the set of guidelines, wherein the AI application did not comply with the non-compliant areas in the set of guidelines.

10. The computer-implemented method of claim 6, further comprising:
assigning weights to each regulation in the set of guidelines based on a likelihood of applicability of the regulation to the AI application;
using the assigned weights, generating the compliance indicator,
wherein discrepancies between 1) the expected outcome of the particular test case to the case-specific outcome received from the AI application and 2) the expected explanation of the particular test case to the corresponding case-specific explanation of the case-specific outcome are weighted in accordance with the assigned weights; and
wherein the compliance indicator comprises a numerical score representing an overall level of compliance of the AI application with the set of guidelines.

11. The computer-implemented method of claim 6, further comprising:
updating the set of guidelines based on one or more of: feedback or changes in regulatory requirements;
modifying the set of test cases and re-evaluating the AI application against the updated set of guidelines.

12. A non-transitory, computer-readable storage medium comprising instructions thereon, wherein the instructions when executed by at least one data processor of a system, cause the system to:
obtain a set of regulatory guidelines defining one or more operation boundaries of an AI application,
wherein the AI application is configured to generate, in response to a received input, an outcome and an explanation of how the outcome was determined;

construct a set of test cases associated with each regulatory guideline in the set of regulatory guidelines,
   wherein each test case maps to a specific scenario derived from the regulatory guidelines,
   wherein each test case comprises: (1) a prompt, (2) an expected outcome, and (3) an expected explanation, and
   wherein each test case is configured to test the one or more operation boundaries of the regulatory guidelines;
evaluate the AI application against the set of test cases to determine compliance of the AI application with the regulatory guidelines by applying a particular test case in the set of test cases to the AI application by:
   supplying the prompt of the particular test case into the AI application,
   responsive to inputting the prompt, receiving, from the AI application, a case-specific outcome and a corresponding case-specific explanation of the case-specific outcome,
   comparing the expected outcome of the particular test case to the case-specific outcome received from the AI application, and
   responsive to the expected outcome of the particular test case satisfying the case-specific outcome received from the AI application, comparing the expected explanation of the particular test case to the corresponding case-specific explanation of the case-specific outcome;
using the evaluation, generate a first indicator of the AI application indicating compliance of the AI application with the regulatory guidelines using the comparison between the expected outcome of the particular test case and the case-specific outcome received from the AI application; and
using the evaluation, generate a second indicator of the AI application indicating compliance of the AI application with the set of regulatory guidelines using the comparison between the expected explanation of the particular test case and the corresponding case-specific explanation of the case-specific outcome; and
automatically adjusting parameters of the AI application based on the evaluation, the first indicator, and the second indicator,
   wherein adjusting the parameters of the AI application aligns the AI application within the one or more operation boundaries of the set of regulatory guidelines.

13. The non-transitory, computer-readable storage medium of claim 12, wherein the instructions further cause the system to:
   using the first indicator and the second indicator, generate a modification plan associated with the AI application,
      wherein implementing the modification plan aligns 1) the expected outcome of the particular test case with the case-specific outcome received from the AI application and 2) the expected explanation of the particular test case with the corresponding case-specific explanation of the case-specific outcome.

14. The non-transitory, computer-readable storage medium of claim 12, wherein determining generating the first indicator and the second indicator includes:
   comparing the evaluation against predefined thresholds or criteria specified by the regulatory guidelines.

15. The non-transitory, computer-readable storage medium of claim 12, wherein the instructions further cause the system to:
   receive an indicator of a type of application associated with the AI application;
   directing an intermediate AI application to identify relevant guidelines associated with the type of application; and
   obtaining the relevant guidelines, via an Application Programming Interface (API).

16. The non-transitory, computer-readable storage medium of claim 12, wherein the instructions further cause the system to:
   store the regulatory guidelines in a vector space representation,
      wherein the regulatory guidelines are stored in a structured format.

17. The non-transitory, computer-readable storage medium of claim 12, wherein generating the set of test cases further comprises:
   partitioning the regulatory guidelines into scenarios, each scenario representing a particular feature of a corresponding guideline; and
   partitioning each scenario into the set of test cases, each test case configured to test the operation boundaries of a corresponding scenario.

18. The non-transitory, computer-readable storage medium of claim 12, wherein the regulatory guidelines comprise one or more of: governmental regulations of a specific jurisdiction, organization-specific regulations, or generative AI applications.

* * * * *